United States Patent
Fujishiro

(10) Patent No.: US 12,513,780 B2
(45) Date of Patent: Dec. 30, 2025

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 511 days.

(21) Appl. No.: 17/934,881

(22) Filed: Sep. 23, 2022

(65) Prior Publication Data

US 2023/0017794 A1 Jan. 19, 2023

Related U.S. Application Data

(63) Continuation of application No. PCT/JP2021/008641, filed on Mar. 5, 2021.

(30) Foreign Application Priority Data

Mar. 26, 2020 (JP) .................. 2020-056518

(51) Int. Cl.
| | |
|---|---|
| *H04W 76/30* | (2018.01) |
| *H04W 72/231* | (2023.01) |
| *H04W 74/0833* | (2024.01) |
| *H04W 88/04* | (2009.01) |

(52) U.S. Cl.
CPC ......... *H04W 76/30* (2018.02); *H04W 72/231* (2023.01); *H04W 74/0833* (2013.01); *H04W 88/04* (2013.01)

(58) Field of Classification Search
None
See application file for complete search history.

(56) References Cited

U.S. PATENT DOCUMENTS 11,177,870 B2  11/2021  Kim et al.
2016/0157283 A1*  6/2016  Yu ............... H04W 36/0061
                                                   455/437
2017/0295531 A1  10/2017  Singh et al.
(Continued)

FOREIGN PATENT DOCUMENTS

CN        110178441 A      8/2019
WO    WO-2017099833 A1 *  6/2017  ............ H04W 76/23
(Continued)

OTHER PUBLICATIONS

Oppo; "New SID: Study on NR Sidelink Relay"; 3GPP TSG RAN Meeting #86; RP-193253; Dec. 9-12, 2019; pp. 1-5; Sitges, Spain.
(Continued)

*Primary Examiner* — Jamaal Henson
(74) *Attorney, Agent, or Firm* — Studebaker Brackett PLLC

(57) ABSTRACT

A communication control method is a method using a relay user equipment relaying communication between a base station and a remote user equipment. The communication control method includes establishing a connection between the remote user equipment and the relay user equipment, and performing a random access procedure establishing a connection between the remote user equipment and the base station. The performing the random access procedure includes a proxy operation where the relay user equipment, instead of the remote user equipment, performs at least a part of an operation to be performed by a Medium Access Control (MAC) layer in the random access procedure.

3 Claims, 16 Drawing Sheets

(56) References Cited

U.S. PATENT DOCUMENTS

| | | |
|---|---|---|
| 2018/0213577 A1 | 7/2018 | Burbidge et al. |
| 2019/0320361 A1 | 10/2019 | Uchiyama et al. |
| 2019/0387446 A1 | 12/2019 | Xu et al. |
| 2021/0051758 A1* | 2/2021 | Xu .................. H04W 76/18 |

FOREIGN PATENT DOCUMENTS

| | | | |
|---|---|---|---|
| WO | WO-2017196611 A1 * | 11/2017 | |
| WO | 2018/028694 A1 | 2/2018 | |
| WO | WO-2020186526 A1 * | 9/2020 | ............ H04W 68/00 |

OTHER PUBLICATIONS

Huawei, HiSilicon; "Paging and Access"; 3GPP TSG RAN WG2 Meeting #97; R2-1701136; Feb. 13-17, 2017; pp. 1-6; Athens, Greece.

RAN WG2; "Presentation of Specification/Report to TSG: TR 36.746, Version 2.0.1"; 3GPP TSG-RAN Meeting #77; Tdoc RP-171987; Sep. 11-14, 2017; pp. 1-5; Sapporo, Japan.

Coolpad; "Discussion on Signaling Radio Bearer Modelling for L2 Relay UE"; 3GPP TSG RAN WG2 Meeting #98; R2-1704553; May 15-19, 2017; pp. 1-5; Hangzhou, China.

Vivo; "Remaining Issues for SL SRB"; 3GPP TSG-RAN WG2 Meeting #109-e; R2-2000280; Feb. 24-Mar. 6, 2020; pp. 1-4; Electronic meeting.

Zte, "Discussion on connection establishment and bearer setup", 3GPP TSG-RAN WG2 Meeting #96, R2-168149, Nov. 14-18, 2016, pp. 1-4, Reno, USA.

* cited by examiner

COMMUNICATION CONTROL METHOD

RELATED APPLICATIONS

The present application is a continuation based on PCT Application No. PCT/JP2021/008641, filed on Mar. 5, 2021, which claims the benefit of Japanese Patent Application No. 2020-056518 filed on Mar. 26, 2020. The content of which is incorporated by reference herein in their entirety.

TECHNICAL FIELD

The present disclosure relates to a communication control method used in a mobile communication system.

BACKGROUND ART

In a mobile communication system based on the 3rd Generation Partnership Project (3GPP) standard, a technology of sidelink relay using a user equipment as a relay node has been under study. The sidelink relay is a technology in which a relay node referred to as a relay user equipment (Relay UE) mediates communication between a base station and a remote user equipment (Remote UE) and relays the communication.

CITATION LIST

Non-Patent Literature

Non-Patent Literature 1: 3GPP Contribution "RP-193253", Internet <URL: https://www.3gpp.org/ftp/tsg_ran/TSG_RAN/TSGR_86/Docs/RP-193253.zip>

SUMMARY OF INVENTION

A communication control method according to a first aspect is a method using a relay user equipment relaying communication between a base station and a remote user equipment. The communication control method includes establishing a connection between the remote user equipment and the relay user equipment, and performing a random access procedure establishing a connection between the remote user equipment and the base station. The performing the random access procedure includes a proxy operation where the relay user equipment, instead of the remote user equipment, performs at least a part of an operation to be performed by a Medium Access Control (MAC) layer in the random access procedure.

A communication control method according to a second aspect is a method using a relay user equipment relaying communication between a base station and a remote user equipment. The communication control method includes establishing a connection between the remote user equipment and the relay user equipment, and transmitting, from the remote user equipment to the base station via the relay user equipment, a Radio Resource Control (RRC) message allowing the remote user equipment to connect to the base station. The transmitting the RRC message includes transmitting the RRC message including information indicating that the RRC message has been transmitted via the relay user equipment.

A communication control method according to a third aspect is a method using a relay user equipment relaying communication between a base station and a remote user equipment. The communication control method includes of transmitting and receiving, by the remote user equipment and to and from the base station via the relay user equipment on a first signaling radio bearer, a first Radio Resource Control (RRC) message used to control communication with the base station, and transmitting and receiving, by the remote user equipment and to and from the relay user equipment on a second signaling radio bearer different from the first signaling radio bearer, a second RRC message used to control communication with the relay user equipment.

A communication control method according to a fourth aspect is a method using a relay user equipment relaying communication between a base station and a remote user equipment. The communication control method includes receiving, by the remote user equipment, a Radio Resource Control (RRC) message from the base station via the relay user equipment, and performing, by the remote user equipment, a notification operation notifying the relay user equipment of a content of the RRC message.

A communication control method according to a fifth aspect is a method using a relay user equipment relaying communication between a base station and a remote user equipment. The communication control method includes receiving, by the base station and from the remote user equipment or the relay user equipment, link identification information identifying a radio link between the remote user equipment and the relay user equipment, and controlling, by the base station, measurement of a radio state between the remote user equipment and the relay user equipment based on the link identification information.

DESCRIPTION OF EMBODIMENTS

The relay user equipment in Background Art cannot interpret the contents of RRC messages transmitted and received by the base station and the remote user equipment via the relay user equipment. In other words, in terms of the RRC connection between the base station and the remote user equipment, the relay user equipment is transparent. However, known mobile communication systems do not take such a new scenario into account and may thus fail to appropriately control communication using the relay user equipment.

Accordingly, an object of the present disclosure is to enable appropriate control of communication using relay user equipment.

A mobile communication system according to an embodiment will be described with reference to the drawings. In the description of the drawings, the same or similar parts are denoted by the same or similar reference signs.

Configuration of Mobile Communication System

Figure 1:
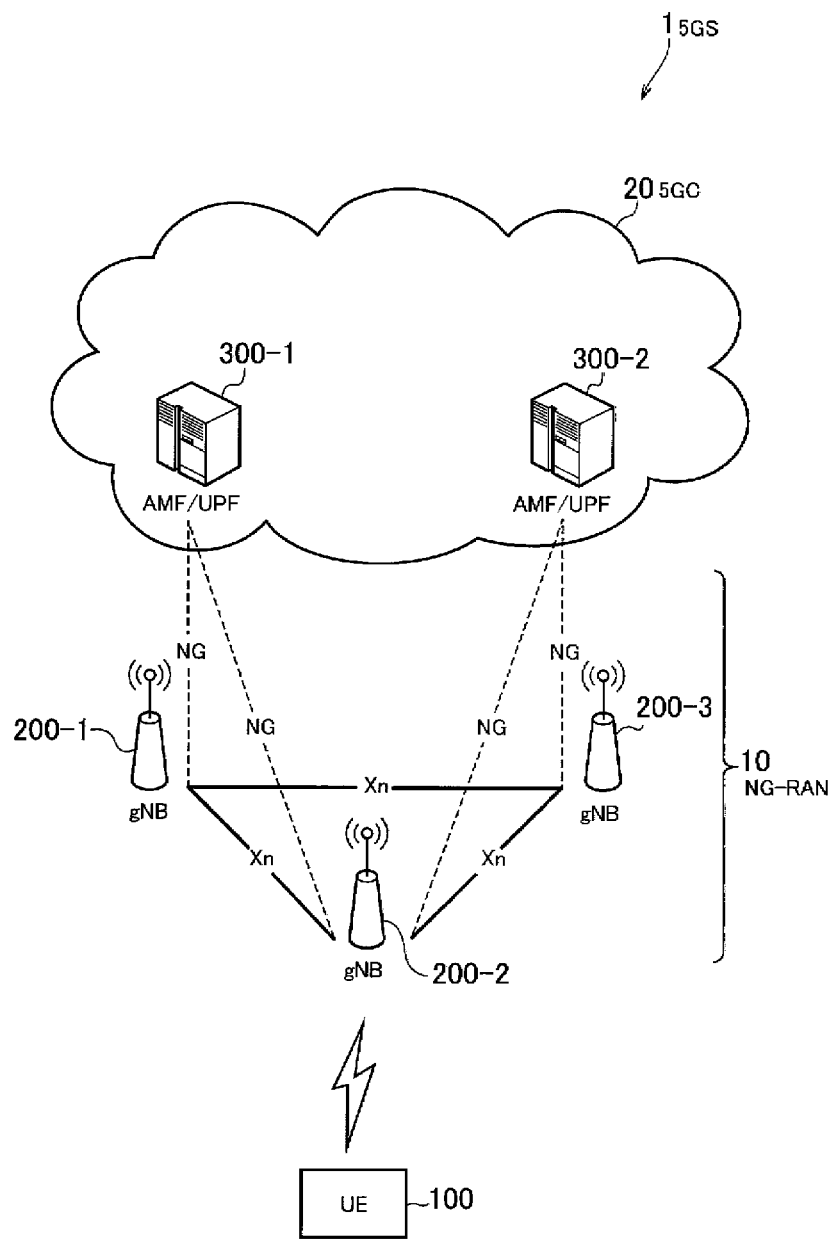
FIG. 1 is a diagram illustrating a configuration of a mobile communication system according to an embodiment.

First, a configuration of a mobile communication system according to an embodiment will be described. FIG. 1 is a diagram illustrating a configuration of the mobile communication system according to an embodiment. This mobile communication system complies with the 5th Generation System (5GS) of the 3GPP standard. The description below takes the 5GS as an example, but a Long Term Evolution (LTE) system may be at least partially applied to the mobile communication system.

As illustrated in FIG. 1, a 5GS 1 includes a User Equipment (UE) 100, a 5G radio access network (Next Generation Radio Access Network (NG-RAN)) 10, and a 5G Core Network (5GC) 20.

The UE 100 is a mobile wireless communication apparatus. The UE 100 may be any apparatus as long as the UE 100 is used by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 are connected to each other via an Xn interface which is an inter-base station interface. Each gNB 200 manages one or a plurality of cells. The gNB 200 performs wireless communication with the UE 100 that has established a connection to its own cell. The gNB 200 has a radio resource management (RRM) function, a function of routing user data (hereinafter simply referred to as "data"), and/or a measurement control function for mobility control and scheduling. A "cell" is used as a term to indicate a minimum unit of a wireless communication area. A "cell" is also used as a term to indicate a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various kinds of mobility control and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
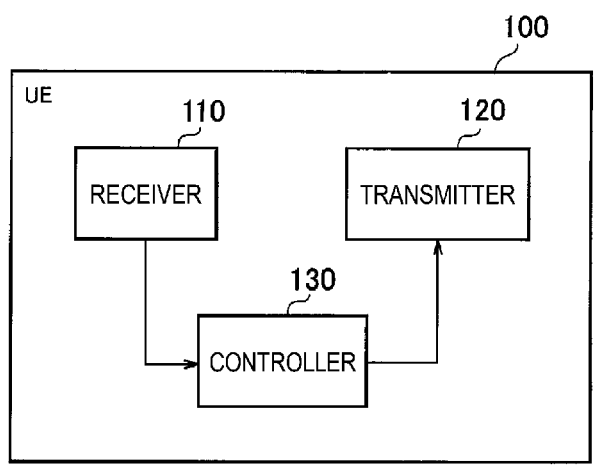
FIG. 2 is a diagram illustrating a configuration of a user equipment (UE) according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various kinds of receptions under control of the controller 130. The receiver 110 includes an antenna and a reception device. The reception device converts a radio signal received by the antenna into a baseband signal (a reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory. The memory stores programs to be executed by the processor and information to be used for processes by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes.

Figure 3:
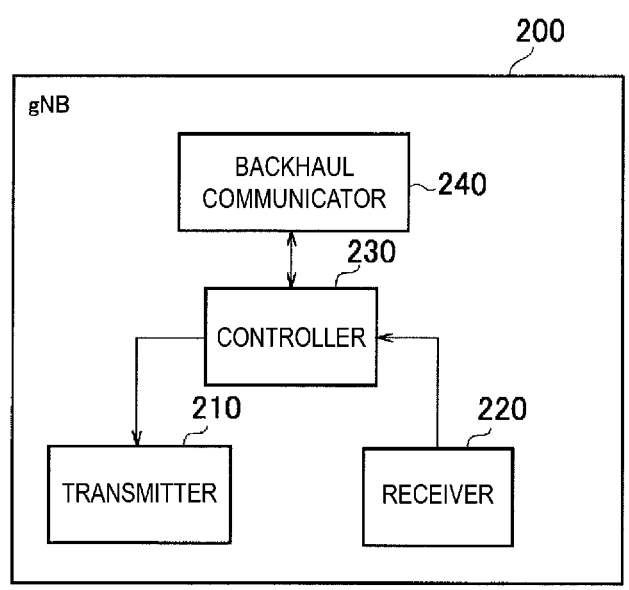
FIG. 3 is a diagram illustrating a configuration of a base station (gNB) according to an embodiment.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various types of control for the gNB 200. The controller 230 includes at least one processor and at least one memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
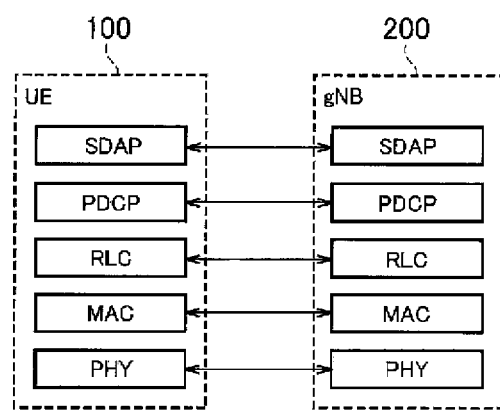
FIG. 4 is a diagram illustrating a configuration of a protocol stack of a radio interface of a user plane.

FIG. 4 is a diagram illustrating a configuration of a protocol stack of a radio interface of a user plane handling data.

As illustrated in FIG. 4, the radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, mapping and demapping of antennas, and mapping and demapping of resources. Data and control information are transmitted between the PHY layer of the UE 100 and the PHY layer of the gNB 200 via a physical channel.

The MAC layer performs priority control of data, a retransmission process through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow which is a unit of QoS control by the core network and a radio bearer which is a unit of QoS control by an Access Stratum (AS). Note that, when the RAN is connected to the EPC, the SDAP may not be provided.

Figure 5:
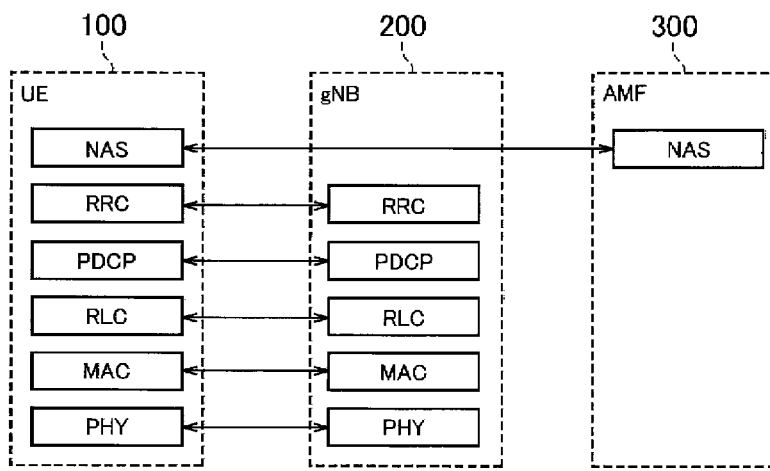
FIG. 5 is a diagram illustrating a configuration of a protocol stack of a radio interface of a control plane.

FIG. 5 is a diagram illustrating a configuration of a protocol stack of a radio interface in a control plane handling signaling (control signals).

As illustrated in FIG. 5, the protocol stack of the radio interface in the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls the logical channel, the transport channel, and the physical channel in response to establishment, reestablishment, and release of the radio bearer. When there is a connection (RRC connection) between the RRC of the UE 100 and the RRC of the gNB 200, the UE 100 is in an RRC connected mode. When there is no connection (RRC connection) between the RRC of the UE 100 and the RRC of the gNB 200, the UE 100 is in an RRC idle mode.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

Assumed Scenario

Figure 6:
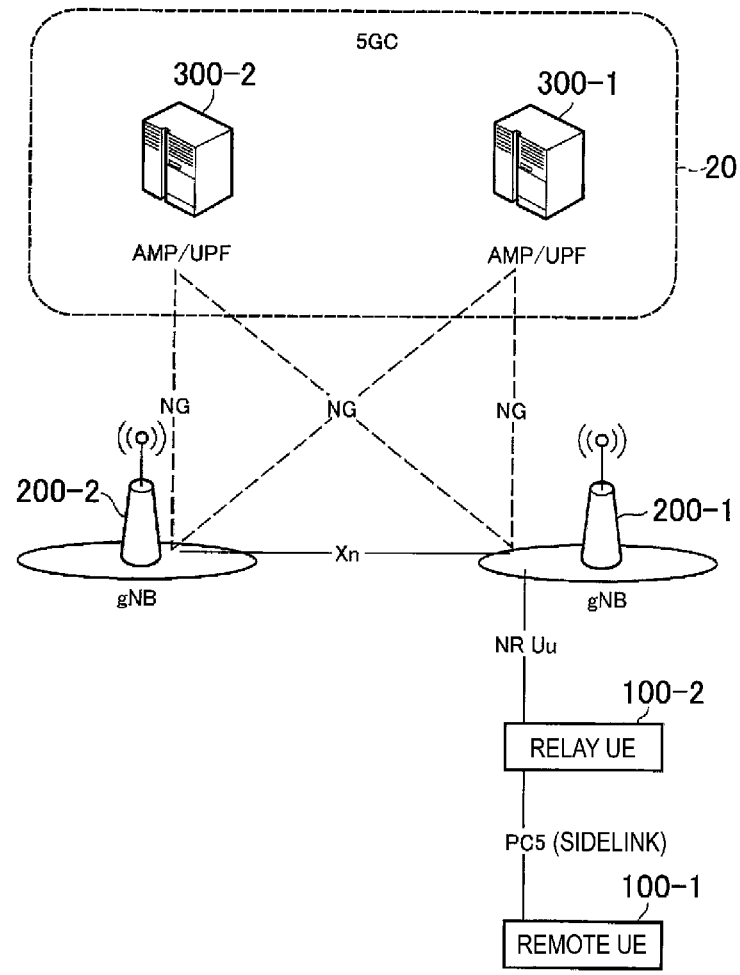
FIG. 6 is a diagram illustrating an assumed scenario of a mobile communication system according to an embodiment.

An assumed scenario for the mobile communication system 1 according to an embodiment will be described. FIG. 6 is a diagram illustrating the assumed scenario.

As illustrated in FIG. 6, a scenario is assumed using sidelink relay in which the relay UE 100-2 mediates the communication between the gNB 200-1 and the remote UE 100-1 and relays the communication.

The remote UE 100-1 performs wireless communication (sidelink communication) with the relay UE 100-2 on a PC5 interface (sidelink) used as an inter-UE interface. The relay UE 100-2 performs wireless communication (Uu communication) with the gNB 200-1 on an NR Uu radio interface. As a result, the remote UE 100-1 communicates indirectly with the gNB 200-1 via the relay UE 100-2. The Uu communication includes uplink communication and downlink communication.

Figure 7:
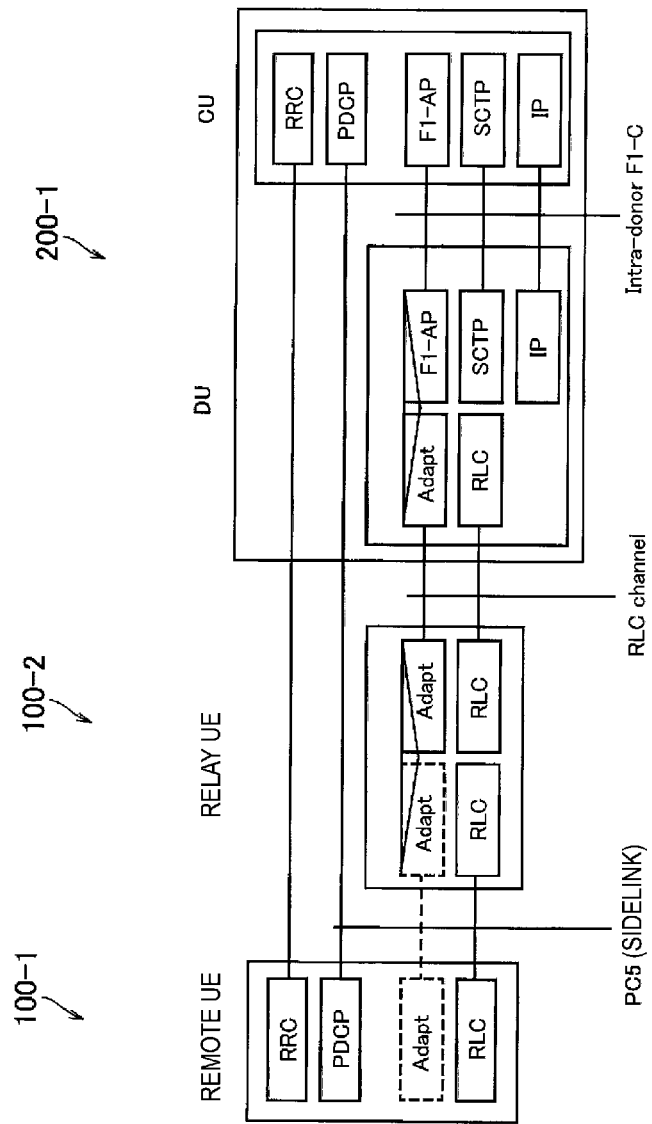
FIG. 7 is a diagram illustrating an example of a protocol stack in the assumed scenario according to an embodiment.

FIG. 7 is a diagram illustrating an example of a protocol stack in the assumed scenario. In FIG. 7, the MAC layer and the PHY layer, used as lower layers of the RLC layer, are not illustrated.

As illustrated in FIG. 7, the gNB 200-1 may be divided into a CU and a DU. An F1-C interface (Intra-donor F1-C) is established between the CU and the DU.

The PDCP layer of the CU of the gNB 200-1 and the PDCP layer of the remote UE 100-1 communicate with each other via the relay UE 100-2. The RRC layer of the CU and the RRC layer of the remote UE 100-1 also communicate with each other via the relay UE 100-2. In the DU, the relay UE 100-2, and the remote UE 100-1, an adaptation (Adapt) layer may be provided as an upper layer of the RLC layer.

Note that, although not illustrated in FIG. 7, the RRC layer of the CU and the RRC layer of the relay UE 100-2 communicate with each other. The PDCP layer of the CU and the PDCP layer of the relay UE 100-2 communicate with each other.

Each of the remote UE 100-1 and the relay UE 100-2 may include an RRC layer for PC5. Such an RRC layer is referred to as "PC5 RRC". The PC5 RRC layer of the remote UE 100-1 and the PC5 RRC layer of the relay UE 100-2 communicate with each other.

Figure 8:
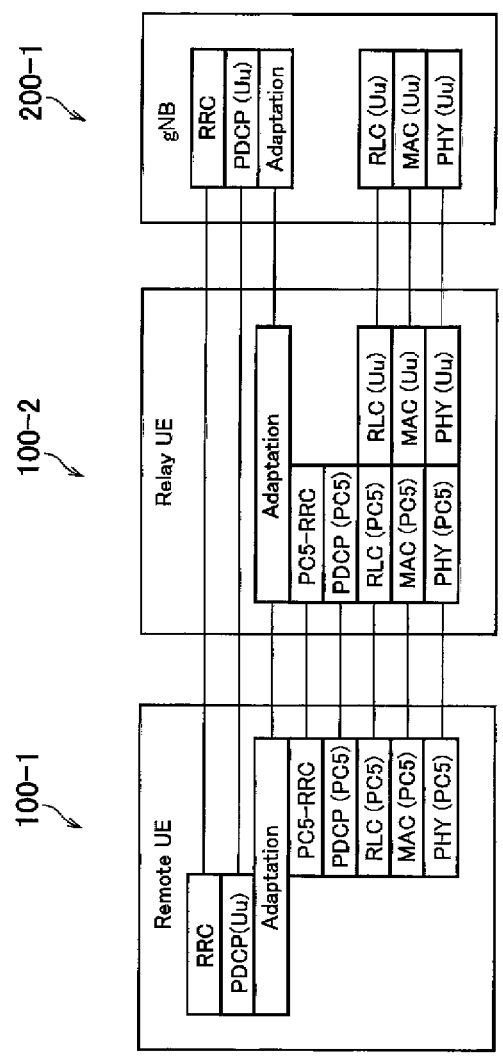
FIG. 8 is a diagram illustrating an example of a protocol stack including a PC5 RRC layer according to an embodiment.
Figure 9:
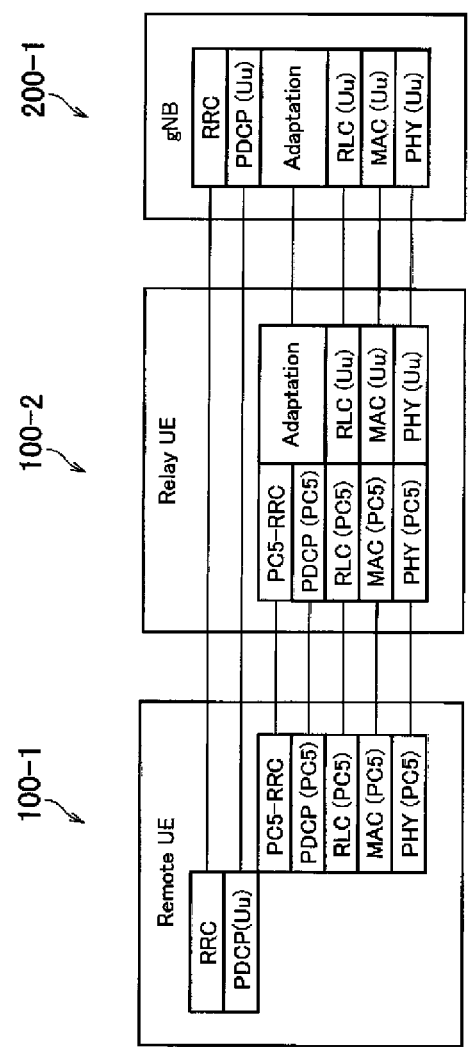
FIG. 9 is a diagram illustrating another example of the protocol stack including the PC5 RRC layer according to an embodiment.

FIG. 8 is a diagram illustrating an example of a protocol stack including the PC5 RRC layer. FIG. 9 is a diagram illustrating another example of the protocol stack including the PC5 RRC layer. FIGS. 8 and 9 illustrate an example in which the gNB 200-1 is not separated into the DU and the CU; however, the gNB 200-1 may be separated into the DU and the CU.

As illustrated in FIG. 8, the gNB 200-1 includes an RRC layer, a PDCP layer (Uu), a RLC layer (Uu), a MAC layer (Uu), and a PHY layer (Uu) that are used for communication (Uu communication) on a Uu interface. The gNB 200-1 includes an adaptation layer between the PDCP layer (Uu) and the RLC layer (Uu).

The relay UE 100-2 includes an RRC layer (not illustrated), an RLC layer (Uu), a MAC layer (Uu), and a PHY layer (Uu) that are used for communication (Uu communication) on a Uu interface. The relay UE 100-2 includes a PC5 RRC layer, a PDCP layer (PC5), a RLC layer (PC5), a MAC layer (PC5), and a PHY layer (PC5) that are used for communication (PC5 communication) on a PC5 interface. Furthermore, the relay UE 100-2 includes an adaptation layer used as an upper layer of the PC5 RRC layer.

The remote UE 100-1 includes an RRC layer and a PDCP layer (Uu) that are used for communication (Uu communication) on a Uu interface. The remote UE 100-1 includes a PC5 RRC layer, a PDCP layer (PC5), a RLC layer (PC5), a MAC layer (PC5), and a PHY layer (PC5) that are used for communication (PC5 communication) on a PC5 interface. Furthermore, the remote UE 100-1 includes an adaptation layer between the PDCP layer (Uu) and the PC5 RRC layer.

As illustrated in FIG. 9, the remote UE 100-1 need not include the adaptation layer. In the example illustrated in FIG. 9, the adaptation layer of the relay UE 100-2 is positioned as an upper layer of the RLC layer (Uu).

Operations of Mobile Communication System

Now, operations of the mobile communication system 1 according to an embodiment will be described.
(1) Operation for Establishing RRC Connection Between Remote UE and gNB An operation for establishing an RRC connection between the remote UE 100-1 and the gNB 200-1 will be described.
(1.1) Operation Pattern 1

The operation pattern 1 includes the step of establishing a connection between the remote UE 100-1 and the relay UE 100-2, and the step of performing a random access procedure for establishing a connection between the remote UE 100-1 and the gNB 200-1. The step of performing the random access procedure includes a proxy operation step in which the relay UE 100-2, instead of the remote UE 100-1, performs at least a part of the operation to be performed by the MAC layer in the random access procedure.

As illustrated in FIGS. 8 and 9, the remote UE 100-1 includes the MAC layer of the PC5 interface but does not include the MAC layer of the Uu interface. On the other hand, the random access procedure includes an operation to be performed by the MAC layer of the Uu interface. Accordingly, instead of the remote UE 100-1, the relay UE 100-2 performs at least a part of the operation to be performed by the MAC layer in the random access procedure, thus enabling achievement of the random access procedure for establishing a connection between the remote UE 100-1 and the gNB 200-1.

Figure 10:
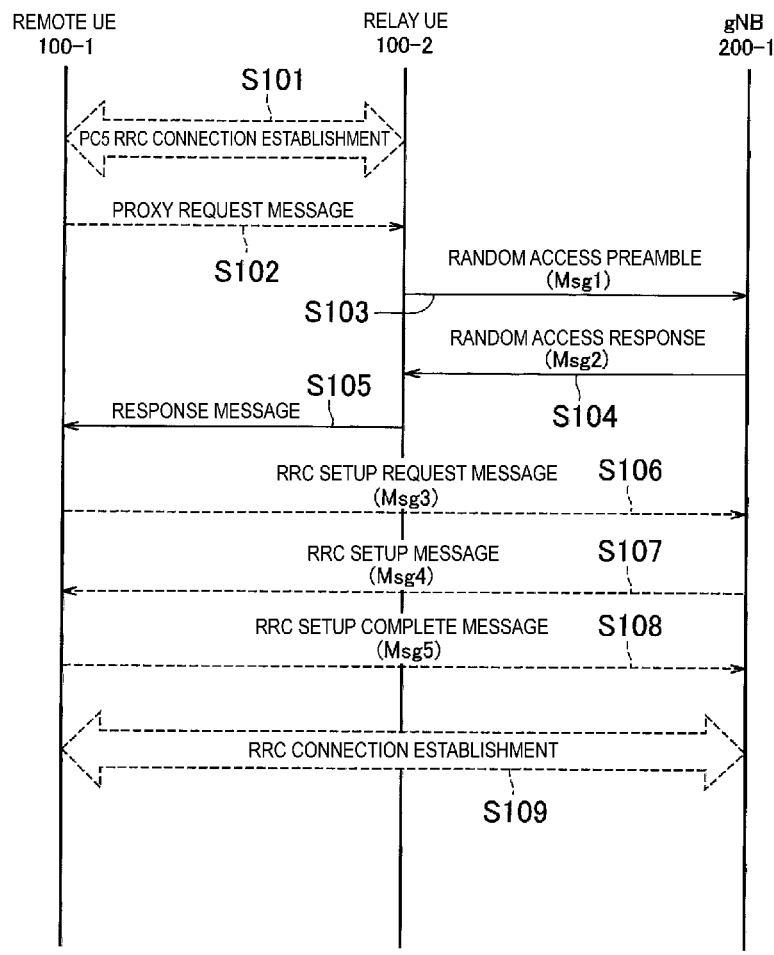
FIG. 10 is a diagram illustrating an operation pattern 1 of an operation for establishing an RRC connection between a remote UE and a gNB according to an embodiment.

FIG. 10 is a diagram illustrating an operation pattern 1 of an operation for establishing an RRC connection between the remote UE 100-1 and the gNB 200-1. In FIG. 10, dashed lines illustrate steps that are optional.

As illustrated in FIG. 10, in step S101, the remote UE 100-1 and the relay UE 100-2 establish a PC5 RRC connection. The PC5 RRC connection refers to a connection established between the PC5 RRC layer of the remote UE 100-1 and the PC5 RRC layer of the relay UE 100-2. On the other hand, no RRC connection needs to have yet been established between the relay UE 100-2 and the gNB 200-1.

Note that the PC5 RRC connection may allow confirmation that the relay UE 100-2 can relay the traffic of the remote UE 100-1 to the gNB 200-1.

For example, the remote UE 100-1 notifies the relay UE 100-2 of a relay request, and the relay UE 100-2 accepts the relay request. The relay UE 100-2 allows the remote UE 100-1 to communicate the traffic to be relayed. Such a confirmation operation can also be applied to each operation pattern described below.

Before step S102, the remote UE 100-1 determines to execute processing for RRC connection establishment with the gNB 200-1. For example, in response to a connection establishment request from the upper layer (NAS layer), the RRC layer generates a message for RRC connection establishment (RRC Setup Request, RRC Resume Request or RRC Reestablishment Request), and provides the message generated to the lower layer. In such a case, the remote UE 100-1 typically triggers a random access procedure for the gNB 200-1. On the other hand, in a case that the relay UE 100-2 performs relay, the remote UE 100-1 communicates using a PC5 MAC entity, and thus uses no Uu MAC entity. In other words, the Uu MAC entity need not perform the random access procedure. Accordingly, the remote UE 100-1 determines not to trigger the random access procedure. In other words, in establishing (resuming) an RRC connection, the remote UE 100-1 determines not to trigger the random access procedure in a case of not using the MAC entity associated with the Uu and/or in a case of using the MAC entity associated with the PC5 for which relay is performed. The remote UE 100-1 may further determine to transmit, to the relay UE 100-2, a proxy request message requesting a proxy operation.

In step S102, the remote UE 100-1 transmits, to the relay UE 100-2, the proxy request message requesting the proxy operation. The proxy request message may be a message requesting the relay UE 100-2 to transmit a random access preamble to the gNB 200-1. The proxy request message is a message transmitted from a predetermined layer of the remote UE 100-1 to the predetermined layer of the relay UE 100-2. The predetermined layer is the MAC layer (PC5), the RLC layer (PC5), the PDCP layer (PC5), the PC5 RRC layer, or the adaptation layer.

In step S103, in response to receiving the proxy request message, the relay UE 100-2 transmits the random access preamble to the gNB 200-1. The random access preamble is transmitted from the MAC layer (Uu) of the relay UE 100-2 to the MAC layer (Uu) of the gNB 200-1. The random access preamble constitutes a first message (referred to as "Msg 1") in the random access procedure. Note that in step S103, the relay UE 100-2 may transmit the random access preamble to the gNB 200-1 in response to the establishment of the PC5 RRC connection (step S101) even in a case of not having received the proxy request message. In a case that the relay UE 100-2 has already established an RRC connection to the gNB 200-1, steps S103 and S104 may be omitted, and the response message in step S105 may be transmitted from the relay UE 100-2 to the remote UE 100-1.

In step S104, the gNB 200-1 transmits a random access response to the relay UE 100-2. The relay UE 100-2 receives the random access response. The random access response is transmitted from the MAC layer (Uu) of the gNB 200-1 to the MAC layer (Uu) of the relay UE 100-2. The random access response constitutes a second message (referred to as "Msg 2") in the random access procedure. The random access response includes an uplink grant indicating uplink radio resources allocated to the relay UE 100-2 by the gNB 200-1 and a timing advance value for adjusting an uplink transmission timing for the relay UE 100-2.

Here, the transmission and reception of the Msg 1 in step S103 and the transmission and reception of the Msg 2 in step S104 correspond to operations to be performed by the MAC layer in the random access procedure.

In step S105, in response to receiving the random access response from the gNB 200-1, the relay UE 100-2 transmits, to the remote UE 100-1, a response message (ACK) responding to the proxy request message. The response message is a message transmitted from a predetermined layer of the relay UE 100-2 to the predetermined layer of the remote UE 100-1. The predetermined layer is the MAC layer (PC5), the RLC layer (PC5), the PDCP layer (PC5), the PC5 RRC layer, or the adaptation layer.

Note that the response message may be transmitted when the PC5 RRC connection is established in step S101. For example, the relay UE 100-2 may transmit the response message in a case that the RRC connection to the gNB 200-1 has already been established and the processing for RRC connection establishment with the remote UE 100-1 is complete and/or in a case that the relay operation is performed (allowed).

In step S106, in response to receiving the response message from the relay UE 100-2, the remote UE 100-1 transmits, to the gNB 200-1 via the relay UE 100-2, the RRC message for the remote UE 100-1 to connect to the gNB 200-1. Such an RRC message constitutes a third message (referred to as "Msg 3") in the random access procedure. The RRC message is intended to be an RRC setup request message requesting establishment of an RRC connection. Note that, the RRC message may be an RRC reestablishment request message requesting reestablishment of an RRC connection or may be an RRC recovery request message requesting recovery of an interrupted RRC connection.

In step S107, in response to receiving the Msg 3 from the remote UE 100-1, the gNB 200-1 transmits the RRC message to the remote UE 100-1 via the relay UE 100-2. Such an RRC message constitutes a fourth message (referred to as "Msg 4") in the random access procedure. The RRC message is intended to be an RRC setup message. Note that, the RRC message may be an RRC reestablishment message or may be an RRC recovery message.

In step S108, in response to receiving the Msg 4 from the gNB 200-1, the remote UE 100-1 transmits the RRC message to the gNB 200-1 via the relay UE 100-2. Such an RRC message constitutes a fifth message (referred to as "Msg 5") in the random access procedure. The RRC message is intended to be an RRC setup complete message. Note that, the RRC message may be an RRC reestablishment complete message or may be an RRC recovery complete message.

In step S109, an RRC connection is established (or reestablished or recovered) between the remote UE 100-1 and the gNB 200-1.

(1.2) Operation Pattern 2

The operation pattern 2 includes the step of establishing a connection between the remote UE 100-1 and the relay UE 100-2, and the step of transmitting, from the remote UE 100-1 to the gNB 200-1 via the relay UE 100-2, an RRC message for the remote UE 100-1 to connect to the gNB 200-1. The step of transmitting the RRC message includes the step of transmitting an RRC message including information (hereinafter referred to as "remote information") indicating that an RRC message has been transmitted via the relay UE 100-2. Here, the RRC message including the remote information is intended to be the Msg 3 or the Msg 5, but an example will be mainly described below in which the remote information is included in the Msg 3.

As described above, in terms of the RRC connection between the gNB 200-1 and the remote UE 100-1, the relay UE 100-2 is transparent, and the RRC layer (Uu) of the gNB 200-1 has difficulty in recognizing whether the Msg 3 (or Msg 5) received by the RRC layer (Uu) has been transmitted via the relay UE 100-2. Thus, the remote UE 100-1 transmits, to the gNB 200-1, the Msg 3 (or Msg 5) including the remote information, thus allowing the gNB 200-1 to appropriately recognize whether the connection request has been transmitted via the relay UE 100-2.

In the operation pattern 2, the step of transmitting the RRC message may include the step of omitting transmission and reception of the random access preamble (Msg 1) and the transmission and reception of the random access response (Msg 2) and transmitting the RRC message from the remote UE 100-1 to the gNB 200-1 via the relay UE 100-2. In other words, unlike the operation pattern 1 described above, the operation pattern 2 may omit transmission and reception of the Msg 1 and the transmission and reception of the Msg 2.

Figure 11:
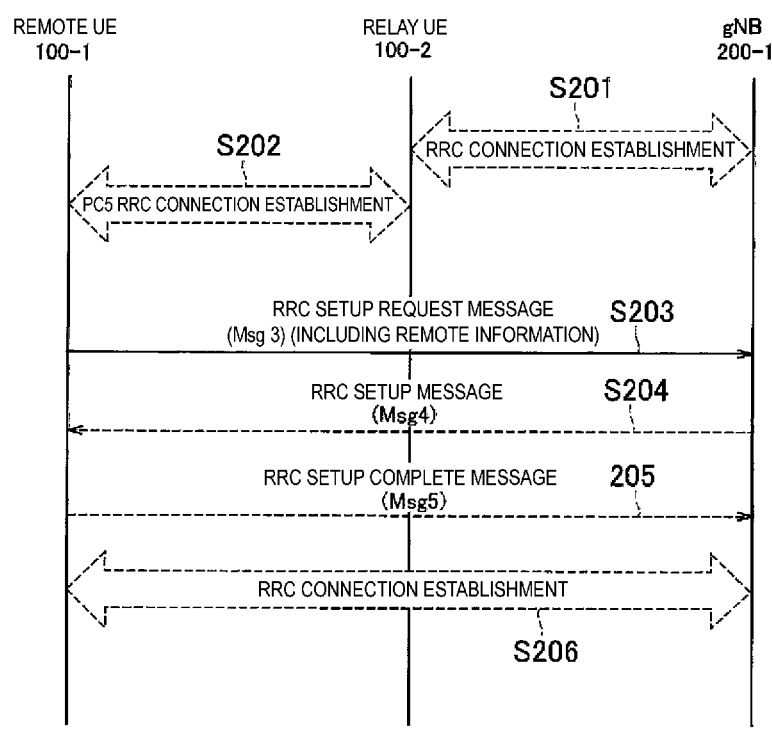
FIG. 11 is a diagram illustrating an operation pattern 2 of the operation for establishing an RRC connection between the remote UE and the gNB according to an embodiment.

FIG. 11 is a diagram illustrating an operation pattern 2 of an operation for establishing an RRC connection between the remote UE 100-1 and the gNB 200-1. In FIG. 11, dashed lines illustrate steps that are optional.

As illustrated in FIG. 11, in step S201, the relay UE 100-2 establishes an RRC connection to the gNB 200-1.

In step S202, the remote UE 100-1 and the relay UE 100-2 establish a PC5 RRC connection. Step S202 may be performed before step S201.

In step S203, the remote UE 100-1 transmits, to the gNB 200-1 via the relay UE 100-2, the RRC message (Msg 3) for the remote UE 100-1 to connect to the gNB 200-1. Such an RRC message constitutes a third message (referred to as "Msg 3") in the random access procedure. Such an RRC message is intended to be an RRC setup request message requesting establishment of an RRC connection. Note that, the RRC message may be an RRC reestablishment request message requesting reestablishment of an RRC connection or may be an RRC recovery request message requesting recovery of an interrupted RRC connection.

Here, the remote UE 100-1 may transmit the RRC message (Msg 3) including remote information indicating that the RRC message has been transmitted via the relay UE 100-2. The remote information may be a flag being "1" in a case of transmission via the relay UE 100-2 and being otherwise "0". The remote information may be included in a Cause field of the RRC message (Msg 3).

Note that the remote information may be an identifier indicating the relay UE 100-2, for example, a Cell-Radio Network Temporary Identifier (C-RNTI) of the relay UE 100-2. In this case, the C-RNTI may be notified from the relay UE 100-2 to the remote UE 100-1 in advance (e.g., in S202).

In step S204, in response to receiving the Msg 3 from the remote UE 100-1, the gNB 200-1 transmits the RRC message (Msg 4) to the remote UE 100-1 via the relay UE 100-2. Such an RRC message is intended to be an RRC setup message. Note that, the RRC message may be an RRC reestablishment message or may be an RRC recovery message.

In step S205, in response to receiving the Msg 4 from the gNB 200-1, the remote UE 100-1 transmits the RRC message (Msg 5) to the gNB 200-1 via the relay UE 100-2. Such an RRC message is intended to be an RRC setup complete message. Note that, the RRC message may be an RRC reestablishment complete message or may be an RRC recovery complete message.

Here, the remote UE 100-1 may transmit the RRC message (Msg 5) including the remote information indicating that the RRC message has been transmitted via the relay UE 100-2. The remote UE 100-1 may transmit the RRC message (Msg 5) including the remote information without transmitting the RRC message (Msg 3) including the remote information. The remote information may be included in the Cause field of the RRC message (Msg 5).

In step S206, an RRC connection is established (or reestablished or recovered) between the remote UE 100-1 and the gNB 200-1.

In this manner, according to the operation pattern 2, the RRC message including the remote information is transmitted from the remote UE 100-1 to the gNB 200-1 via the relay UE 100-2, so that the gNB 200-1 can recognize that the connection request has been transmitted via the relay UE 100-2. In this way, the gNB 200-1 can appropriately perform control for the remote UE 100-1 through the RRC layer.

For example, in the gNB 200-1, after the RRC connection to the remote UE 100-1 is established, an RRC reconfiguration message transmitted to the remote UE 100-1 is used to make a timer configuration value in the PDCP layer or the RRC layer larger than a normal configuration value.

In a case that the relay UE 100-2 includes an adaptation layer, the gNB 200-1 may perform routing configuration for the remote UE 100-1 (e.g., the association of logical channels, etc.) on the adaptation layer of the relay UE 100-2.

Furthermore, after establishing the RRC connection to the remote UE 100-1, the gNB 200-1 can appropriately configure the RLC layer (PC5), the MAC layer (PC5), and the PHY layer (PC5) by using the RRC reconfiguration message transmitted to the remote UE 100-1 or the relay UE 100-2.

Note that the gNB 200-1 may not include the RLC configuration, the MAC configuration, and the PHY configuration of the Uu interface in the RRC reconfiguration message transmitted to the remote UE 100-1. Specifically, in a case of receiving the RRC message including the remote information, the gNB 200-1 does not include the PHY, MAC, and RLC configuration information in the RRC reconfiguration message. On the other hand, in a case of receiving the RRC message including no remote information, the gNB 200-1 includes the PHY, MAC, and RLC configuration information in the RRC reconfiguration message.

(2) Operation Related to RRC Message From gNB to Remote UE

Now, an operation related to the RRC message from the gNB 200-1 to the remote UE 100-1 will be described.

The operation related to the RRC message from the gNB 200-1 to the remote UE 100-1 includes the step of the remote UE 100-1 receiving the RRC message from the gNB 200-1 via the relay UE 100-2, and the step of the remote UE 100-1 performing a notification operation for notifying the relay UE 100-2 of the contents of the RRC message.

As described above, the relay UE 100-2 cannot interpret the contents of the RRC message transmitted and received by the gNB 200-1 and the remote UE 100-1 via the relay UE 100-2. Thus, the remote UE 100-1 performs the notification operation for notifying the relay UE 100-2 of the content of the RRC message received from the gNB 200-1, thus allowing the relay UE 100-2 to recognize the contents of the RRC message.

(2.1) Operation Pattern 1

In the operation pattern 1, the RRC message received by the remote UE 100-1 from the gNB 200-1 via the relay UE 100-2 is the RRC release message. Such an RRC release message is a message for releasing or interrupting the RRC connection between the remote UE 100-1 and the gNB 200-1. In the following, an example will be described in which the RRC release message is a message that releases the RRC connection between the remote UE 100-1 and the gNB 200-1, but the RRC release message may be a message that interrupts the RRC connection. In this case, in the description below, "releasing" of the RRC connection may be interpreted as "interruption" of the RRC connection.

Figure 12:
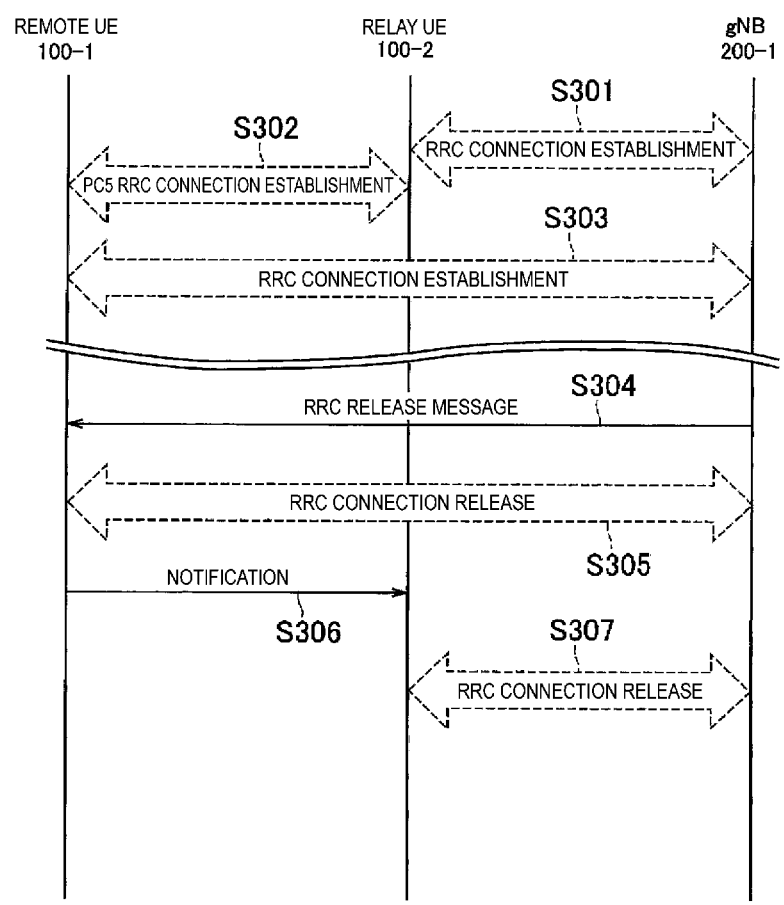
FIG. 12 is a diagram illustrating an operation pattern 1 related to an RRC message from the gNB to the remote UE according to an embodiment.

FIG. 12 is a diagram illustrating an operation pattern 1 related to the RRC message from the gNB 200-1 to the remote UE 100-1. In FIG. 12, dashed lines illustrate steps that are optional.

As illustrated in FIG. 12, in step S301, the relay UE 100-2 establishes an
RRC connection to the gNB 200-1.

In step S302, the remote UE 100-1 and the relay UE 100-2 establish a PC5 RRC connection. Step S302 may be performed before step S301.

In step S303, the remote UE 100-1 establishes an RRC connection to the gNB 200-1.

Then in step S304, the gNB 200-1 transmits the RRC release message to the remote UE 100-1 via the relay UE 100-2.

Note that the gNB 200-1 may include, in the RRC release message, specification information indicating whether the remote UE 100-1 is to remain under control of the relay UE 100-2. In other words, the gNB 200-1 may specify whether to maintain the PC5 RRC connection and whether to reselect a cell (such as the gNB 200-1). In accordance with the instruction in the specification information, the remote UE 100-1 determines a standby operation after the RRC connection is released. For example, the remote UE 100-1 determines an operation for prioritizing the cell reselection operation. The prioritization is an operation such as raising the priority of the cell, lowering the priority of maintenance of the PC5 connection (or releasing the PC5 connection), and/or applying an offset in the reselection determination.

In step S305, in response to receiving the RRC release message from the gNB 200-1, the remote UE 100-1 releases the RRC connection to the gNB 200-1

In step S306, the remote UE 100-1 transmits, to the relay UE 100-2, a notification indicating the reception of the RRC release message and/or the release of the RRC connection to the gNB 200-1. Such a notification is a message transmitted from a predetermined layer of the remote UE 100-1 to the predetermined layer of the relay UE 100-2. The predetermined layer is the MAC layer (PC5), the RLC layer (PC5), the PDCP layer (PC5), the PC5 RRC layer, or the adaptation layer.

Instead of such an explicit notification, an implicit notification may be used. The remote UE 100-1 may release the PC5 RRC connection to the relay UE 100-2 in response to the reception of the RRC release message or the release of the RRC connection to the gNB 200-1. In this case, the relay UE 100-2 considers that the RRC connection to the gNB 200-1 has been released in response to the release of the PC5 RRC connection.

In step S307, the relay UE 100-2 releases the RRC connection to the gNB 200-1 in response to the notification from the remote UE 100-1.

(2.2) Operation Pattern 2

In the operation pattern 2, the RRC message received by the remote UE 100-1 from the gNB 200-1 via the relay UE 100-2 includes configuration information used to control communication between the relay UE 100-2 and the gNB 200-1. The remote UE 100-1 transmits, to the relay UE 100-2, the configuration information included in the RRC message.

Such configuration information is configuration information for the Uu interface. Such configuration information is hereinafter referred to as "Uu RLC/MAC/PHY configuration information". The RRC message may further include configuration information used to control communication between the remote UE 100-1 and the relay UE 100-2 (i.e., configuration information for the PC5 interface). Thus, by using one RRC message transmitted to the remote UE 100-1, the gNB 200-1 can perform both RRC reconfiguration of the remote UE 100-1 and RRC reconfiguration of the relay UE 100-2.

Figure 13:
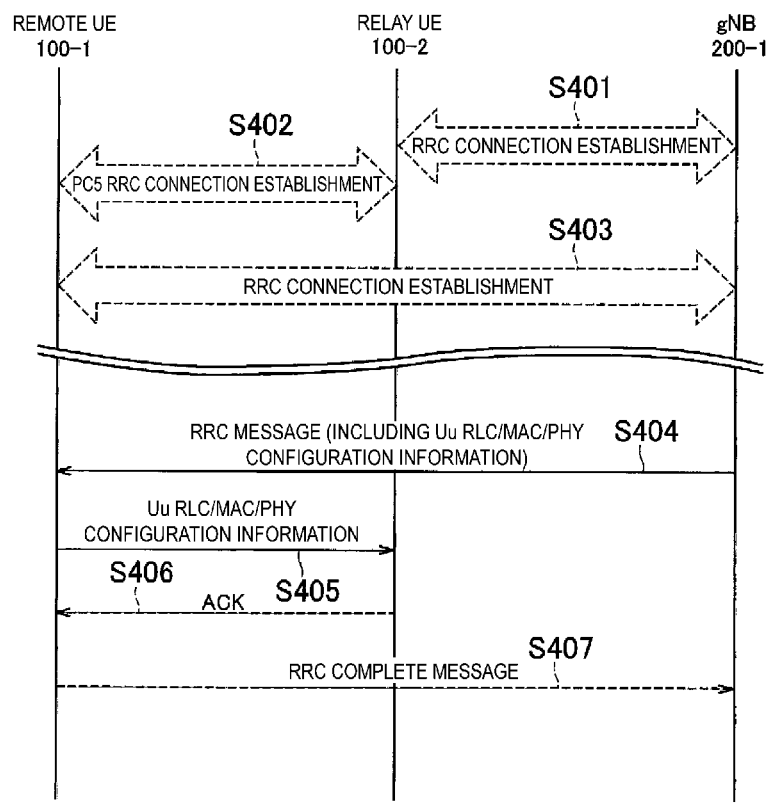
FIG. 13 is a diagram illustrating the operation pattern 1 related to the RRC message from the gNB to the remote UE according to an embodiment.

FIG. 13 is a diagram illustrating an operation pattern 1 related to the RRC message from the gNB 200-1 to the remote UE 100-1. In FIG. 13, dashed lines illustrate steps that are optional.

As illustrated in FIG. 13, in step S401, the relay UE 100-2 establishes an RRC connection to the gNB 200-1.

In step S402, the remote UE 100-1 and the relay UE 100-2 establish a PC5 RRC connection. Step S402 may be performed before step S401.

In step S403, the remote UE 100-1 establishes an RRC connection to the gNB 200-1.

Then in step S404, the gNB 200-1 transmits the RRC message to the remote UE 100-1 via the relay UE 100-2. Such an RRC message is, for example, the RRC setup message, the RRC recovery message, the RRC reestablishment message, or the RRC reconfiguration message. The RRC message includes the Uu RLC/MAC/PHY configuration information. The RLC/MAC/PHY configuration information may include CellGroupConfig, corresponding to configuration information indicating configurations for a cell group in the Uu interface, or may include configuration information (for example, routing information, and the like) for the adaptation layer of the relay UE 100-2.

After the remote UE 100-1 receives the RRC message, in a case that the RRC message further includes configuration information for the PC5 interface, the remote UE 100-1 uses the configuration information to perform RRC reconfiguration in the PC5 interface.

In step S405, the remote UE 100-1 transmits, to the relay UE 100-2, a message including the Uu RLC/MAC/PHY configuration information included in the RRC message. Such a message is a message transmitted from a predetermined layer of the remote UE 100-1 to the predetermined layer of the relay UE 100-2. The predetermined layer is the MAC layer (PC5), the RLC layer (PC5), the PDCP layer (PC5), the PC5 RRC layer, or the adaptation layer. The relay UE 100-2 receives this message, and then performs RRC reconfiguration in the Uu interface by using the Uu RLC/MAC/PHY configuration information.

In step S406, the relay UE 100-2 transmits an acknowledgement message (ACK) to the remote UE 100-1.

In step S407, in response to receiving the acknowledgement message (ACK), the remote UE 100-1 transmits the RRC complete message to the gNB 200-1 via the relay UE 100-2. The RRC complete message is, for example, the RRC setup complete message, an RRC recovery complete message, the RRC reestablishment complete message, or an RRC reconfiguration complete message.

Note that the relay UE 100-2 may transmit a negative acknowledgement message (NACK) to the remote UE 100-1 instead of the acknowledgement message (ACK) in a case that the RRC reconfiguration using the Uu RLC/MAC/PHY configuration information fails. In response to receiving the negative acknowledgement message (NACK), the remote UE 100-1 may consider the RRC reconfiguration to be unsuccessful and initiate RRC reestablishment processing. In the RRC reestablishment processing, the remote UE 100-1 may include information indicating a failure of the RRC reconfiguration in the relay UE 100-2, in the Cause field in the RRC reestablishment request message transmitted to the reconnection destination (e.g., gNB 200-2).

(3) Signaling Radio Bearer

Figure 14:
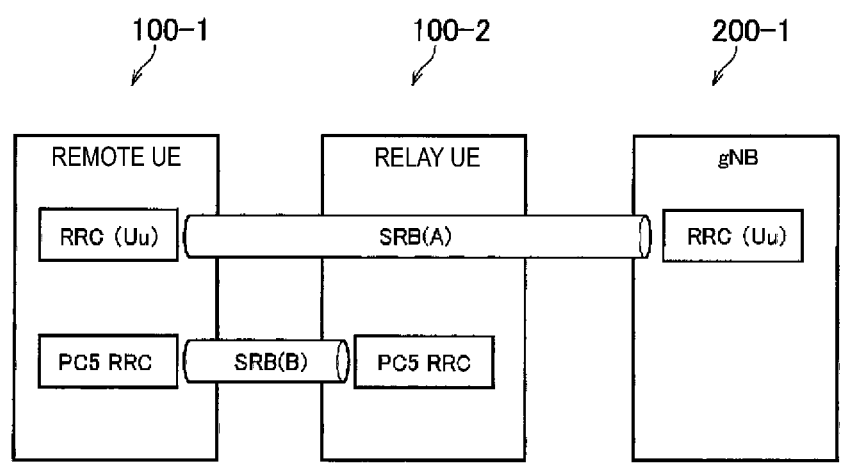
FIG. 14 is a diagram illustrating a signaling radio bearer according to an embodiment.

Now, a signaling radio bearer according to an embodiment will be described. FIG. 14 is a diagram illustrating the signaling radio bearer according to an embodiment.

As illustrated in FIG. 14, the remote UE 100-1 includes an RRC layer (Uu) and a PC5 RRC layer. The RRC layer (Uu) and the PC5 RRC layer may be separate RRC entities or may be separate functions in one RRC entity.

The RRC layer (Uu) of the remote UE 100-1 transmits and receives a first RRC message used to control communication with the gNB 200-1, to and from the RRC layer (Uu) of the gNB 200-1 on a first signaling radio bearer (SRB (A)) via the relay UE 100-2.

On the other hand, the PC5 RRC layer of the remote UE 100-1 transmits and receives a second RRC message used to control communication with the relay UE 100-2, to and from the PC5 RRC layer of the relay UE 100-2 on a second signaling radio bearer (SRB (B)) different from the first signaling radio bearer. Specifically, the signaling radio bearer number of the second signaling radio bearer (SRB (B)) is different from the signaling radio bearer number of the first signaling radio bearer (SRB (A)).

By dividing the signaling radio bearer in this manner, the first RRC message and the second RRC message are easily distinguished from each other, allowing the first RRC message and the second RRC message to be appropriately transmitted and received.

Alternatively, the first signaling radio bearer and the second signaling radio bearer may be the same signaling radio bearer. In this case, the RRC layer (Uu) of the remote UE 100-1 may include the first RRC message used to control communication with the gNB 200-1, in the second RRC message used to control communication with the relay UE 100-2, for transmission and reception.

(4) Operation for Measuring Radio State Between Remote UE and Relay UE

Now, description will be given of an operation for measuring the radio state between the remote UE 100-1 and the relay UE 100-2 according to an embodiment.

One remote UE 100-1 may connect to a plurality of relay UEs 100-2, and a plurality of remote UEs 100-1 may connect to one relay UE 100-2. Thus, it is desirable to enable determination of which remote UE 100-1 and which relay UE 100-2 are used to measure the radio state of the radio link between the UEs. Note that the radio state to be measured may be received power, e.g., a Received Signal Strength Indicator (RSSI), or may be the degree of congestion for each predetermined frequency unit, for example, a Channel Busy Ratio (CBR).

Thus, link identification information identifying the radio link between the remote UE 100-1 and the relay UE 100-2 is received by the gNB 200-1 from the remote UE 100-1 or the relay UE 100-2. The gNB 200-1 controls measurement of the radio state between the remote UE 100-1 and the relay UE 100-2 based on the link identification information.

Such link identification information may include, for example, a destination identifier identifying a destination in sidelink communication (hereinafter referred to as "sidelink destination identifier"). The sidelink destination identifier may be a Destination Layer-2 ID. Such a sidelink destination identifier may be an identifier allocated by an entity of the core network (ProSe function). With an adaptation layer present, routing information may be used as the link identification information. In other words, links are identified by route configuration. In a case that a backhaul adaptation protocol (BAP) layer is used as the adaptation layer as described above, the link may be identified by a Routing ID, a Path ID, a BAP Address, or the like.

Note that in a case that the communication network between the remote UE 100-1 and the relay UE 100-2 is a wireless LAN, the link identification information may include an access point identifier.

(4.1) Operation Pattern 1

Figure 15:
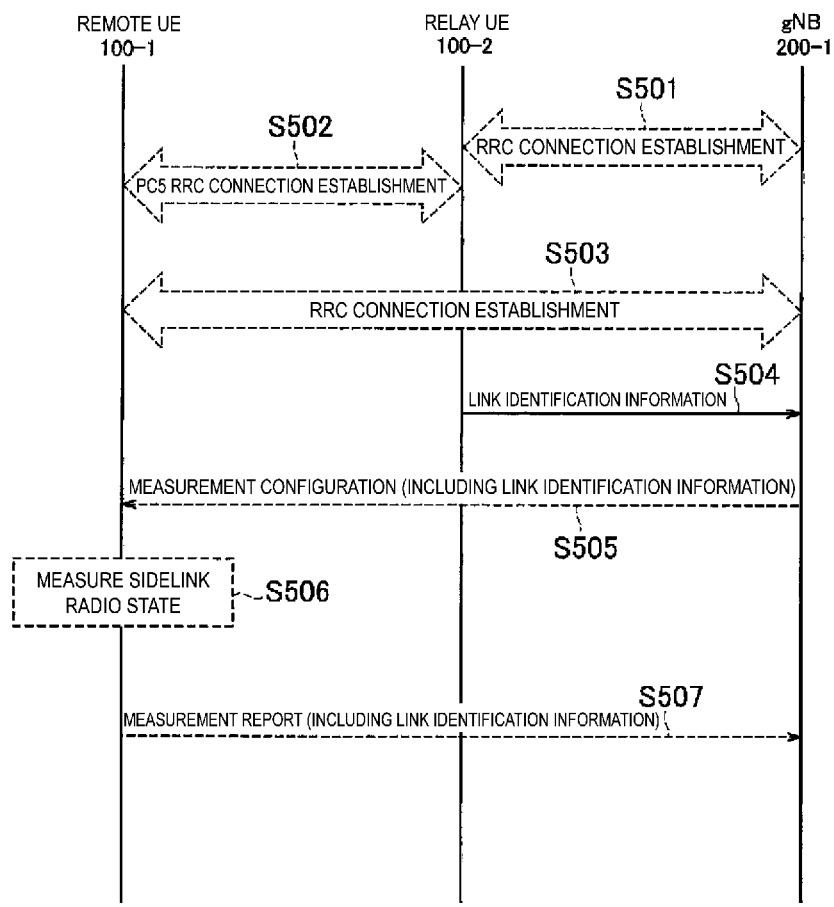
FIG. 15 is a diagram illustrating an operation pattern 1 of an operation for measuring a radio state between the remote UE and relay UE according to an embodiment.

FIG. 15 is a diagram illustrating an operation pattern 1 of an operation for measuring the radio state between the remote UE 100-1 and the relay UE 100-2 according to an embodiment. In FIG. 15, dashed lines illustrate steps that are optional.

As illustrated in FIG. 15, in step S501, the relay UE 100-2 establishes an RRC connection to the gNB 200-1.

In step S502, the remote UE 100-1 and the relay UE 100-2 establish a PC5 RRC connection. Step S502 may be performed before step S501.

In step S503, the remote UE 100-1 establishes an RRC connection to the gNB 200-1.

In step S504, the relay UE 100-2 transmits, to the gNB 200-1, a sidelink destination identifier (link identification information) allocated to the relay UE 100-2.

In step S505, the gNB 200-1 transmits, to the remote UE 100-1 via the relay UE 100-2, the RRC message including a measurement configuration. The measurement configuration includes a sidelink destination identifier (link identification information) allocated to the relay UE 100-2. The measurement configuration may further include a trigger condition for a measurement report. The trigger condition may include a threshold value to be compared with a sidelink radio state.

In step S506, the remote UE 100-1 measures a radio state with the relay UE 100-2 (i.e., a radio state of the sidelink) based on the measurement configuration received from the gNB 200-1. Specifically, the remote UE 100-1 determines the measurement to be performed on the relay UE 100-2 based on the sidelink destination identifier (link identification information) included in the measurement configuration and performs the measurement on the relay UE 100-2.

In step S507, the remote UE 100-1 transmits, to the gNB 200-1 via the relay UE 100-2, the RRC message including the measurement report. The remote UE 100-1 may transmit the RRC message including the measurement report in response to satisfaction of the trigger condition configured in the measurement configuration.

The measurement report includes the measurement result in step S506 and a sidelink destination identifier (link identification information) corresponding to the measurement result. Thus, the gNB 200 can identify which relay UE 100-2 corresponds to the measurement result based on the sidelink destination identifier (link identification information) included in the measurement report.

(4.2) Operation Pattern 2

Figure 16:
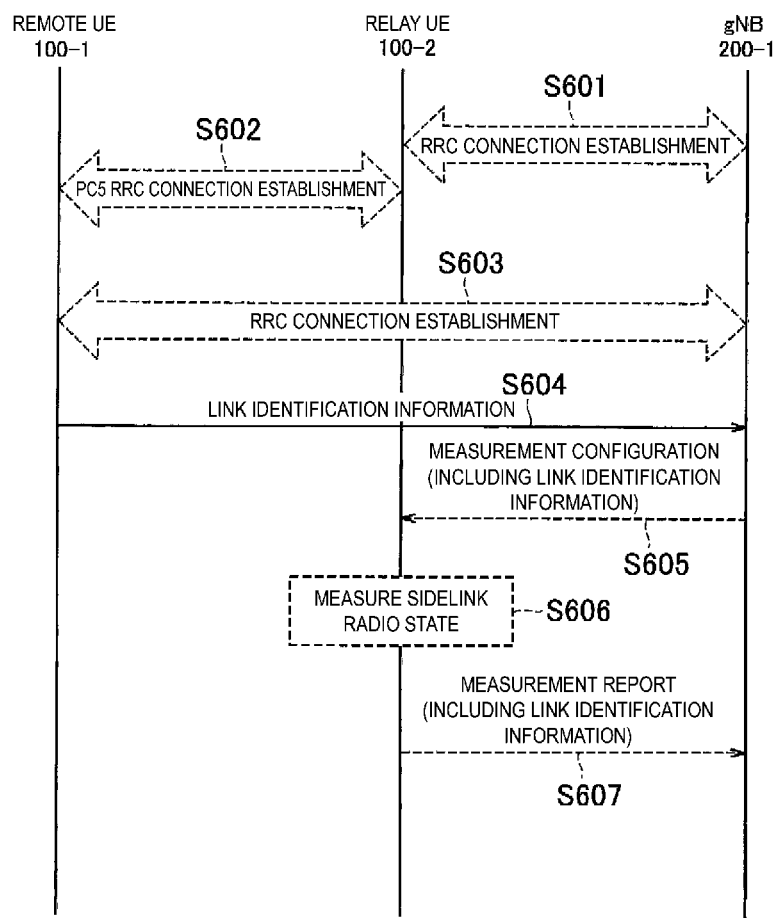
FIG. 16 is a diagram illustrating an operation pattern 2 of an operation for measuring a radio state between the remote UE and the relay UE according to an embodiment.

FIG. 16 is a diagram illustrating an operation pattern 2 of an operation for measuring the radio state between the remote UE 100-1 and the relay UE 100-2 according to an embodiment. In FIG. 16, dashed lines illustrate steps that are optional.

As illustrated in FIG. 16, in step S601, the relay UE 100-2 establishes an RRC connection to the gNB 200-1.

In step S602, the remote UE 100-1 and the relay UE 100-2 establish a PC5 RRC connection. Step S602 may be performed before step S601.

In step S603, the remote UE 100-1 establishes an RRC connection to the gNB 200-1.

In step S604, the remote UE 100-1 transmits, to the gNB 200-1, a sidelink destination identifier (link identification information) allocated to the remote UE 100-1. The remote UE 100-1 may transmit, to the gNB 200-1, the sidelink destination identifier included in the Msg 3 or the Msg 5, or may transmit, to the gNB 200-1, the sidelink destination identifier included in a UE auxiliary information message.

In step S605, the gNB 200-1 transmits, to the relay UE 100-2, the RRC message including the measurement configuration. The measurement configuration includes the sidelink destination identifier (link identification information) allocated to the remote UE 100-1. The measurement configuration may further include the trigger condition for the measurement report. The trigger condition may include the threshold value to be compared with the sidelink radio state.

In step S606, the relay UE 100-2 measures a radio state with the remote UE 100-1 (i.e., the sidelink radio state) based on the measurement configuration received from the gNB 200-1. Specifically, the relay UE 100-2 determines the measurement to be performed on the remote UE 100-1 based on the sidelink destination identifier (link identification information) included in the measurement configuration and performs the measurement on the remote UE 100-1.

In step S607, the relay UE 100-2 transmits, to the gNB 200-1, the RRC message including the measurement report. The relay UE 100-2 may transmit the RRC message including the measurement report in response to satisfaction of the trigger condition configured in the measurement configuration.

The measurement report includes the measurement result in step S606 and the sidelink destination identifier (link identification information) corresponding to the measurement result. Thus, the gNB 200 can identify which remote UE 100-1 corresponds to the measurement result based on the sidelink destination identifier (link identification information) included in the measurement report.

Other Embodiments

The above-described embodiments relate mainly to the operation in the relay UE 100-2, but the operation according to the above-described embodiments may be applied to an Integrated Access and Backhaul (IAB) node corresponding to a wireless relay node. Specifically, the IAB node may perform the operation of the relay UE 100-2 described in the above-described embodiments. In such embodiments, the "relay UE" in the above-described embodiments may be interpreted as the "IAB node", the "sidelink" in the above-described embodiment may be interpreted as an "access link". The PC5 RRC connection may be interpreted as an RRC connection to the IAB node or an RRC connection to an IAB donor.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

In addition, circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design modifications can be made without departing from the gist of the present disclosure.

The invention claimed is:

1. A communication control method using a relay user equipment configured to relay communication between a base station and a remote user equipment, the communication control method comprising:
   receiving, by the remote user equipment, a Radio Resource Control (RRC) release message from the base station via the relay user equipment; and
   after completion of releasing or suspending a RRC connection between the remote user equipment and the base station in response to reception of the RRC release message, performing, by the remote user equipment, a notification operation configured to notify the relay user equipment of a content of the RRC release message received from the relay user equipment.

2. A remote user equipment configured to perform communication between a base station via a relay user equipment, the remote user equipment comprising:
   a receiver configured to receive a Radio Resource Control (RRC) release message from the base station via the relay user equipment; and
   a transmitter configured to, after completion of releasing or suspending a RRC connection between the remote user equipment and the base station in response to reception of the RRC release message, notify the relay user equipment of a content of the RRC release message received from the relay user equipment.

3. An apparatus configured to control a remote user equipment configured to perform communication between a base station via a relay user equipment, the apparatus comprising
   a processor and a memory, the apparatus configured to receive a Radio Resource Control (RRC) release message from the base station via the relay user equipment, and
   after completion of releasing or suspending a RRC connection between the remote user equipment and the base station in response to reception of the RRC release message, notify the relay user equipment of a content of the RRC release message received from the relay user equipment.

* * * * *